US007139984B2

(12) United States Patent
Beaumont et al.

(10) Patent No.: US 7,139,984 B2
(45) Date of Patent: Nov. 21, 2006

(54) DATA ENTRY IN A VIRTUAL ENVIRONMENT WITH POSITION INDICATOR MOVEMENT CONSTRAINED BETWEEN LOCATIONS ASSOCIATED WITH SELECTABLE OPTIONS

(75) Inventors: David O Beaumont, Ipswich (GB); Mohammad S Azam, Ipswich (GB)

(73) Assignee: British Telecommunications, London (GB)

( * ) Notice: Subject to any disclaimer, the term of this patent is extended or adjusted under 35 U.S.C. 154(b) by 652 days.

(21) Appl. No.: 10/204,546

(22) PCT Filed: Feb. 22, 2001

(86) PCT No.: PCT/GB01/00769

§ 371 (c)(1), (2), (4) Date: Aug. 22, 2002

(87) PCT Pub. No.: WO01/71472

PCT Pub. Date: Sep. 27, 2001

(65) Prior Publication Data

US 2003/0014437 A1 Jan. 16, 2003

(30) Foreign Application Priority Data

Mar. 20, 2000 (EP) ................................ 00302229

(51) Int. Cl.

*G09G 5/00* (2006.01)
*G06G 17/00* (2006.01)
*G06F 3/00* (2006.01)

(52) U.S. Cl. ...................... 715/848; 715/850; 715/507

(58) Field of Classification Search ............... 715/848, 715/849, 850, 852, 851, 790, 507, 841, 863, 715/808; 395/353, 352, 354, 347
See application file for complete search history.

(56) References Cited

U.S. PATENT DOCUMENTS

| | | | | |
|---|---|---|---|---|
| 4,763,356 | A * | 8/1988 | Day et al. | 379/368 |
| 5,805,167 | A * | 9/1998 | van Cruyningen | 715/808 |
| 5,812,134 | A * | 9/1998 | Pooser et al. | 715/848 |
| 5,926,178 | A * | 7/1999 | Kurtenbach | 715/834 |
| 6,058,397 | A * | 5/2000 | Barrus et al. | 707/104.1 |
| 6,215,498 | B1 * | 4/2001 | Filo et al. | 345/419 |
| 6,349,301 | B1 * | 2/2002 | Mitchell et al. | 707/101 |
| 2001/0034661 | A1 * | 10/2001 | Ferreira | 705/26 |

* cited by examiner

*Primary Examiner*—Ba Huynh
*Assistant Examiner*—Jordany Nunez
(74) *Attorney, Agent, or Firm*—Nixon & Vanderhye P.C.

(57) ABSTRACT

Information is entered into a data record which utilizes a virtual environment. A user can direct an avatar in this environment and at least one location in the virtual environment is associated with a field of the data record and with one or more selectable information options for inclusion in the field. The user is provided with representations of the selectable information options distributed around the location and the position of the avatar in the virtual environment is monitored. In the event that the avatar moves into a predefined proximity with one of the representations of the selectable options, the selection of that one of the selectable options is detected and that selected one option is then stored in the associated field of the data record.

6 Claims, 8 Drawing Sheets

300 OBJECT BUMPED ; BUMP TRIGGERED
302 OPEN HTTP CONNECTION
304 EXECUTE SCRIPT WITH ARGUMENT AS PASSED
306 WRITE RESULT TO STORE
308 READ STORE BACK INTO DOCUMENT
310 RETURN DOCUMENT

SERVER COMPUTER
Appln SW
SW Storage medium
COMMUNICATION NETWORK
Text file
Executable script
SERVER COMPUTER
Interface Appln SW
Client computer
2
4
5
6
8
10
12
14
16

LICENSE TYPE
MOTORCYCLE
20
22
24
26
28
30

OBJECT BUMPED ; BUMP TRIGGERED
OPEN HTTP CONNECTION
EXECUTE SCRIPT WITH ARGUMENT AS PASSED
WRITE RESULT TO STORE
READ STORE BACK INTO DOCUMENT
RETURN DOCUMENT
300
302
304
306
308
310

LICENSE TYPE
MOTORCYCLE
30
32
34
36
38
40

DATA ENTRY IN A VIRTUAL ENVIRONMENT WITH POSITION INDICATOR MOVEMENT CONSTRAINED BETWEEN LOCATIONS ASSOCIATED WITH SELECTABLE OPTIONS

This application is the U.S. national phase of international application PCT/GB01/00769 filed 22 Feb. 2001 which designated the U.S.

BACKGROUND

1. Technical Field

The present invention relates to a method of and apparatus for the entry of data into an information system.

2. Related Art

Many techniques for the entry of data into information systems have been tried over the span of human history, including many different methods based on textual and graphic representations. The advent of the computer and more recently, computer networks, have provided for yet more sophisticated techniques.

The vastly distributed information system known as the World Wide Web (WWW or Web) is largely composed of documents created in the HyperText Markup Language (HTML). A widespread technique for data entry in respect of Web applications is the use of an HTML form. See, for example, the "Hypertext Transfer Protocol HTTP/1.0" document of the Internet Engineering TaskForce (IETF), published August 1995, authored by Berners-Lee, Fielding and Frystyk.

An HTML form is a special type of HTML document. Unlike an ordinary HTML document, a user is allowed to input information (for example text input or so-called checkboxes, radio buttons and ranges) into the form and when complete, the user may click a submit button, whereupon the form is sent to an associated address for processing as appropriate.

The widespread use of such forms, whilst utilising user familiarity with the concept of its predecessor, the printed form, can however entail significant disadvantages.

Due, for example, to the still largely textual nature of these forms, any users having difficulty with the reading of the form will be at a considerable disadvantage relative to a user who can read and fill in the form with ease. An obvious example is a user with a deficient grasp of the language in which the form is expressed. Further examples include pre-school children and the elderly, where such users may not be able to read the form or may not yet have acquired a sufficiently sophisticated understanding of what is required of them in filling in such an electronic form.

A rather more intuitive user interface is perhaps provided in a three-dimensional virtual environment. It is to be noted that the three dimensional nature of the virtual environment typically refers to the degrees of freedom of movement of the user within the virtual environment. At the present time the user interface typically takes the form of a two-dimensional view (on a monitor or other display) of the three-dimensional virtual environment.

The possibilities of reproducing real world behaviour in these environments make for a more intelligible experience. A conventional method of describing the Eiffel Tower, for example, might rely on providing two-dimensional pages with text and photographic images, as for example in a guide book or in a set of linked HTML pages forming a Web site. A virtual environment simulation might instead allow the user to walk (or even fly) around the structure in a much closer approximation to being present at the Eiffel Tower than was possible with conventional techniques.

As far as data entry in a three dimensional virtual environment is concerned, however, it is still typical to fall back on the use of an HTML form. When desired, such a form may be presented in a Web browser window in conjunction with the user's view of the virtual environment. The user would then fill in the form in the usual 'point and click' manner before submission as above, upon which control of the avatar could be resumed.

BRIEF SUMMARY

According to one aspect of the present invention, there is provided a method of entering information into a data record utilising a virtual environment in which a user can direct at least one avatar; at least one location in said virtual environment being associated with a field of said data record and with one or more selectable information options for inclusion in said field, the method comprising: providing said user with representations of said selectable information options distributed around said at least one location; monitoring the position of said avatar in said virtual environment; in the event that said avatar moves into a predefined proximity with one of said representations of said selectable options, detecting the selection of said one of said selectable options; and storing said selected one option in said field of said data record.

In this way, the invention provides significant advantages in a user interface for data entry. A user's avatar, in moving through a virtual environment, can effect data entry merely by entering into proximity with an appropriate option of a number of options presented in response to a need for filling in of a data field.

By way of trivial example, if a field in the data record provided for a choice of fruit to be made, a user's avatar could be presented with symbols or objects depicting an apple, orange, pear and so on. The user could then select the option orange merely by walking up to or touching the orange in the virtual environment. The sufficient proximity of the avatar to the orange would then trigger a recordal of orange as the appropriately selected option for that field in the data record. The data record, when completed, can then be processed in whichever manner is required.

This easily understood interface coupled with the freedom in choosing representations for the fields and options (for example, a textual, graphic or aural representation) allows for a much improved ergonomic performance in the gathering of information.

In this way, a greatly widened set of users will be able to utilise the method and those that do will have a reduced data entry error rate compared with conventional, less intuitive techniques.

According to a second aspect of the present invention, there is provided a method of entering information into a data record utilising a display over which a user can direct at least one pointer; at least one location in said display being associated with a field of said data record and with one or more selectable information options for inclusion in said field, the method comprising: providing said user with representations of associated selectable information options distributed around said at least one location; monitoring the position of said pointer in said display; in the event that said pointer moves into a predefined proximity with one of said representations of said selectable options, detecting the selection of said one of said selectable options; and storing said selected one option in said field of said data record.

BRIEF DESCRIPTION OF THE DRAWINGS

A number of embodiments of the invention will now be described by way of example with reference to the accompanying drawings in which.

DETAILED DESCRIPTION OF EXEMPLARY EMBODIMENTS

Figure 1:
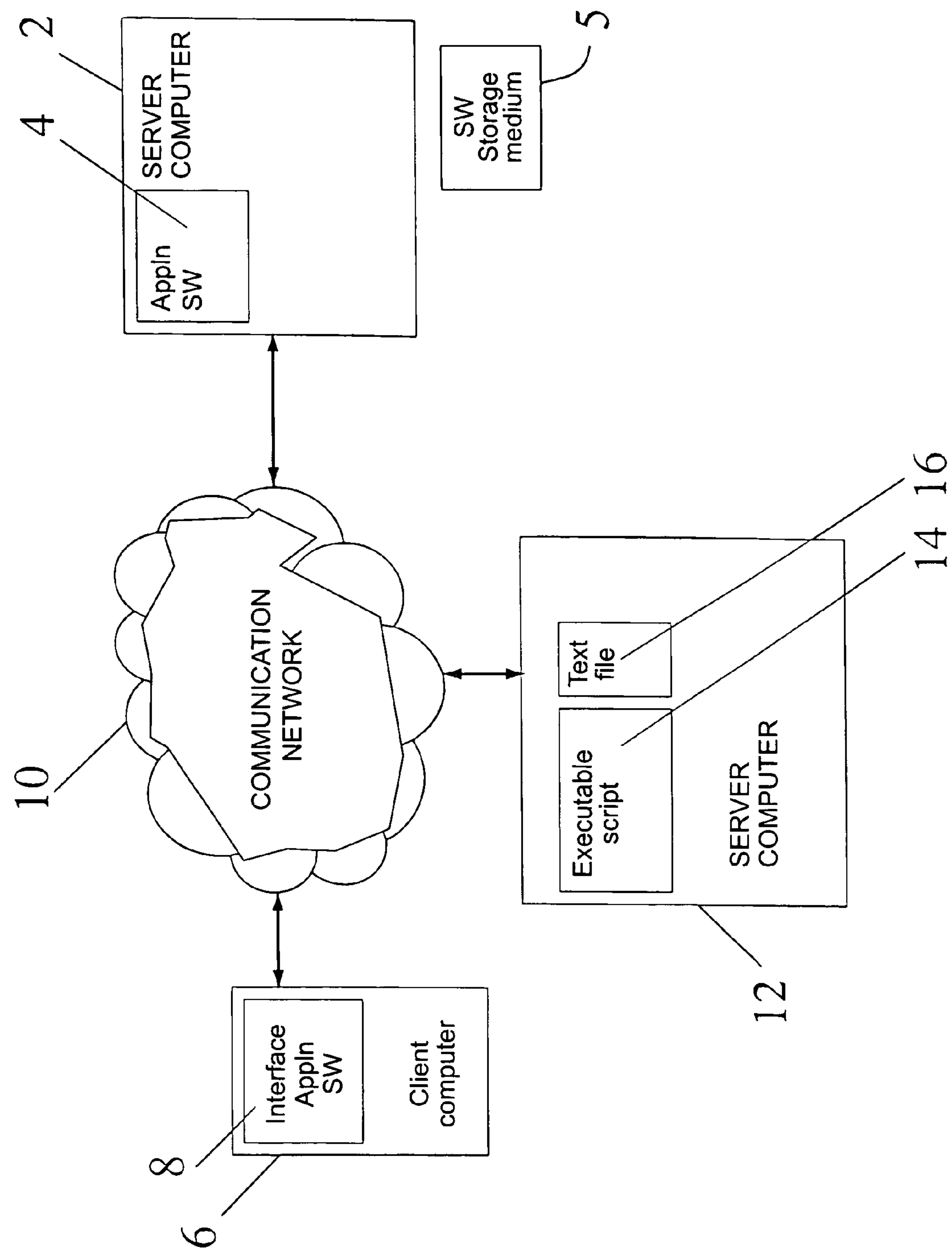
FIG. 1 is a schematic representation of a distributed computer network.

FIG. 1 illustrates a schematic view of a distributed computer system.

Whilst many real world applications of the invention will best utilise a distributed computer system to operate, the invention does not require a distributed computer system to operate. The method of data entry provided by the invention may be used on a stand alone computer.

A virtual environment is typically created through the running of a virtual environment application on a server computer. In this embodiment a first server computer 2 runs such application software 4 to host a virtual environment. The first server computer 2 also runs application software (not shown) to provide well known Web server functionality.

The application software 4 may be loaded onto the first server computer in a variety of ways. The software code may be loaded from a computer readable storage medium 5 such as a floppy disk, a CD-ROM, a DVD-ROM or similar. Likewise the software could be downloaded over, for example, network 10.

A first client computer 6 runs virtual environment interface application software 8. When the client computer 6 is connected, by means of a network 10 to the first server computer 2, a user of the client computer 6 may interact with the virtual environment hosted on the first server computer 2. The first client computer 6 also runs application software (not shown) to provide well known Web browser functionality. Client computer 6 will also be provided with a user display (not shown), for example, a monitor and a means of user input (not shown), for example a keyboard and/or a device such as a mouse.

By way of interaction of a user with this virtual environment, it has become customary to refer to the entity (if visible, often but not exclusively taking human form) which represents the user in the virtual environment and acts therein under the control of the user, as a so-called avatar.

Having a user represented in the virtual environment by an avatar allows the user to see (from the point-of-view of the avatar) and, if desired, be seen (for example, by other avatars). Typically the user can control the actions of the avatar by means of the keyboard and/or a device such as a mouse. The use of the term avatar in this specification denotes location of the presence of the user such that interaction with the virtual environment according to the user's wishes can be monitored. In particular, no limitation as to form of avatar is to be understood (it is not necessary, for example, for others to be able to see an avatar; an avatar might simply act as a 'point of view' that a user can cause to move about).

More generally in, for example, a more simple application, a user might express their intention simply through the use of a traditional arrow pointer under the control of a mouse or similar device.

The communication network 10 may for, example, be the well known internet, utilising Transmission Control Protocol/Internet Protocol (TCP/IP) but providing for higher level protocols such as HTTP.

Examples of client/server virtual environment application programs and associated on-line services are those provided by ActiveWorlds.com Inc. (including the well known virtual environment AlphaWorld) and blaxxun interactive Inc. (including the well known Community Platform tool and associated CyberTown environment).

A second server computer 12 is also connected to the network 10. Application software there provided includes an executable script 14 and, again, application software (not shown) to provide Web server functionality. Furthermore, provision is made for the creation and storage of a text file 16 as will be discussed below.

Figure 2:
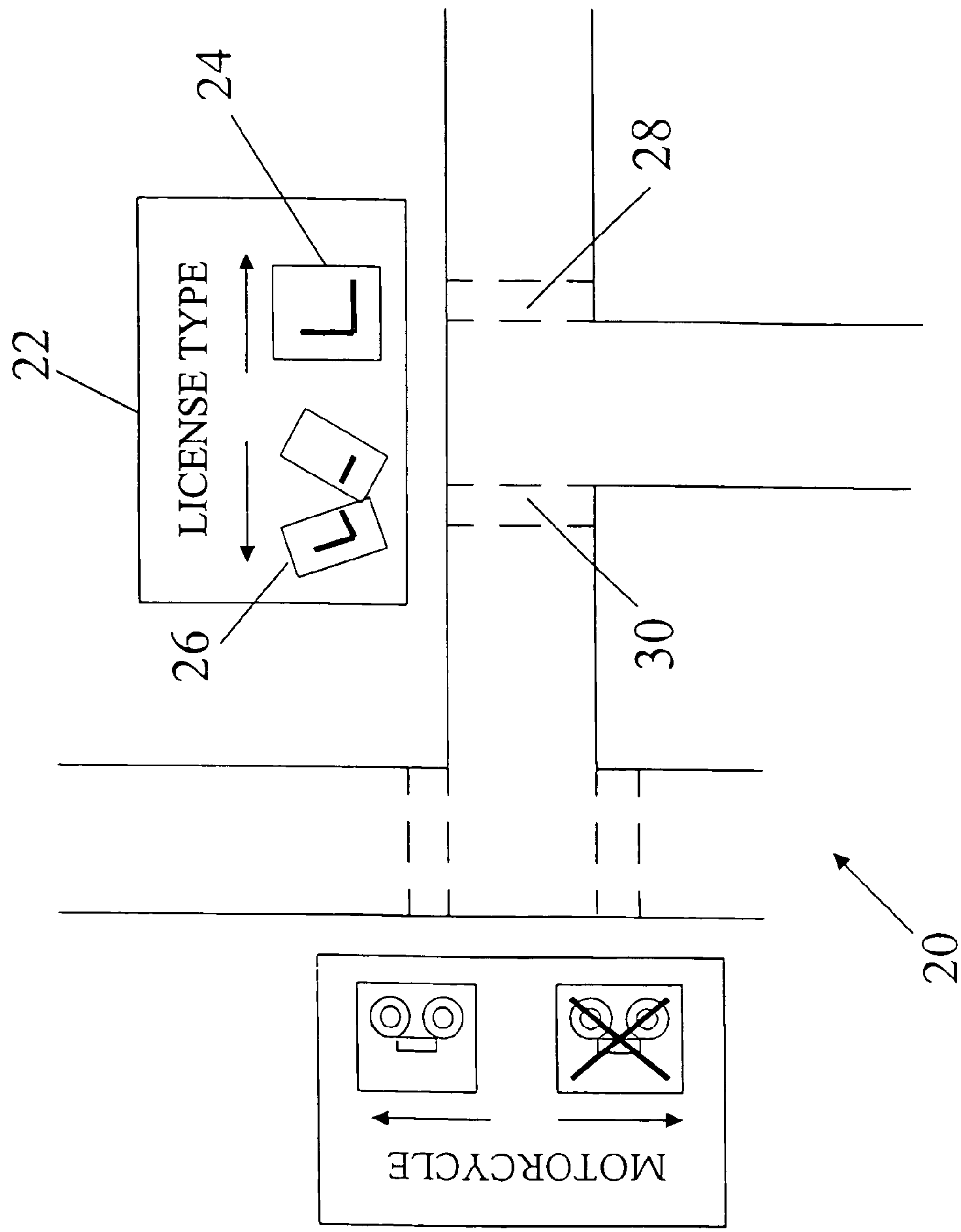
FIG. 2 is a schematic representation of a birds-eye view of a portion of a virtual environment.

FIG. 2 illustrates a birds-eye view of a portion of a virtual environment constructed, by way of this example, for the purpose of completing an application form for a driving licence.

As discussed above, whilst a virtual environment may be referred to as being three-dimensional, this typically indicates that a user is able to move the avatar representative with three degrees of freedom (forward/back, left/right and up/down). The user's perception of the virtual environment (from the point-of-view of the avatar) arises from the computed two-dimensional representation of the virtual environment on, for example, the client computer display.

Using appropriate virtual environment construction tools, virtual objects can be created and placed at the desired position in the virtual environment. In this way, structures analogous to the real world, for example buildings, can be reproduced in the virtual world.

Typically, as with the real world, there will be a limit to the size of the portion of a virtual environment that a user will be able to perceive at any given time. In a trivial environment it might conceivably be the case that a user could view the whole virtual environment (a single room for example). More generally however only the current environs of the avatar will be perceived. In this way the computational load associated with presenting the avatar point of view can be kept as low as required. A decision will therefore be made by the virtual environment designer as to how close to an object an avatar has to be before it becomes visible.

Functionality can be associated with objects in the virtual environment as desired, one mechanism for which is the use of so-called trigger points.

The virtual environment application programs indicated above have an Application Program Interface (API) which includes functionality relating to such trigger points. A trigger point is associated with an object located in the virtual environment. Such a trigger point is also associated with an action which is to occur if the trigger is activated in some manner, for example, a so-called Bump action.

A Bump action will typically occur when a user's avatar comes into contact with an object. If the object is represented in the virtual environment as being a solid object then the avatar will touch the boundary of the object and pass no further. However, the object need not be discernable to the user such that the avatar could touch the boundary of the object and pass onward, through the object. In this way, an invisible and immaterial object could be located in a doorway and a Bump action triggered by an avatar walking through a doorway, entirely oblivious to the object located therein.

Such an association command might, for example, take the form of:

create visible off, solid off; bump url { . . . } where contact with the trigger point object will cause the virtual environment application program 4 to pass the given URL { . . . } to the virtual environment interface application 8 on the client computer 6. The virtual environment interface application 8 will then cause the Web browser on the client computer 6 to open an HTTP connection and, for example, cause the Web page associated with the given URL { . . . } to be displayed to the user in the Web browser window (in addition to the users view of the virtual environment).

Instead of passively returning an HTML document however, HTTP also allows the execution of a program following such a call. The URL { . . . }, for example, may identify a so-called script (including the server and directory in which script resides) which can perform an operation. An argument can be passed to this script such that the operation is carried out on the basis of the argument provided. One example is a search carried out in respect of a provided query term. The results of this operation can then be formatted as an HTML document and returned to close the HTTP connection as before.

Such scripts can, for example, be written with scripting languages such as Perl or as a shell script.

Given that HTTP is a so-called stateless protocol, when a result (for example an HTML document) is returned in response to an HTTP request, that HTTP connection is then closed and no outstanding state remains. If an operation which is to be carried out using a series of HTTP connections requires the holding of some state between connections, then a means of holding that state must be found, as will be discussed below.

Having regard to FIG. 2, for the purposes of this embodiment according to the invention, a maze structure 20 is created in the virtual environment. Such a maze 20 can be constructed, as indicated above, from building block elements in the virtual environment. The elements constituting the walls of the maze 20 can be defined as being impenetrable for a user's avatar. In this way, the branching of the maze can be used to constrain the movement of an avatar through the maze. In the particular example of an avatar traversing this maze structure 20 the above mentioned sphere of perception may simply extend, as in the real world, as far as the next maze passage and wall permits.

The designer of the maze can associate various points in the maze with given data fields in a data record. The branching passages of the maze leading away from that point can then correspond to the options available for that data field. In this way, the fields and options required in a driving licence application form can be represented in the branch structure of a maze.

Having regard to FIG. 2, when beginning to traverse the maze 20 to complete the application form for a driving licence, a first choice of licence type must be made; whether a provisional or a full driving licence is required. At the first branch of the maze the data entry choice of the different types of licence that are available is represented graphically at a first point 22 on the maze wall. A representation of the provisional driving licence option 24 is indicated toward the right, whereas a representation of the full driving licence option 26 is indicated toward the left.

A right hand invisible and immaterial wall object 28 is placed across the right hand pathway such that any avatar moving off down the right hand passageway will encounter and pass through the right hand wall object 28. In this way Bump command associated with the right hand wall object 28 will thereby be triggered. Similarly, a left hand invisible and immaterial wall object 30 is placed across the left hand pathway such that any avatar moving off down the left hand passageway will encounter and pass through the left hand wall object 30. In this way Bump command associated with the left hand wall object 30 will thereby be triggered.

http://server2.relevantauthority.gov provides for the client Web browser to open an HTTP connection with the server at the identified address, drive-cgi indicates the directory of that server in which the relevant script is to be found, licence_form.cmd indicates the script which is to be executed and ?type=full provides that the script is to be executed with argument type set to full.

Figure 3:
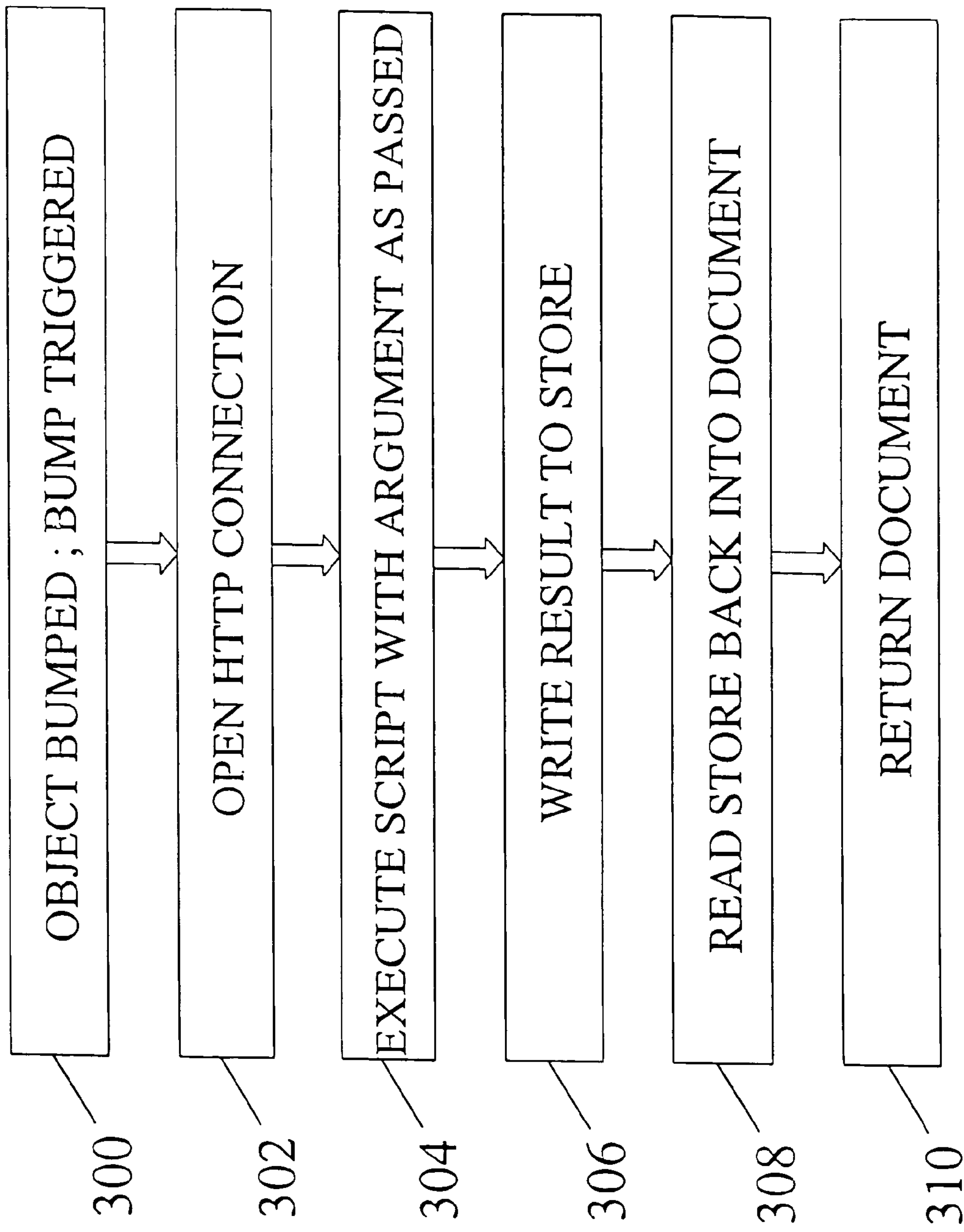
FIG. 3 is a flowchart of a method according to the invention.

Having regard to FIGS. 1 and 3, the execution of the Bump command will therefore cause the virtual environment application program 4 to pass the given URL to the virtual environment interface application 8 on the client computer 6.

Through the use of, for example, Active X technology (Microsoft Corporation), a Web browser such as Internet Explorer™ (Microsoft Corporation) can be embedded in the virtual environment interface application 8. In this way, the Web browser can be caused to operate under the control of the virtual environment interface application 8.

Accordingly, in a second step 302, the virtual environment interface application 8 will then cause the Web browser on the client computer 6 to open an HTTP connection through the network 10, to, in this embodiment, the second server computer 12. As indicated above, an executable script 14 is stored in the second server computer 12.

In a third step 304, the script 14, licence_form.cmd, stored in the identified directory on the second server computer 12 is executed with argument type=full.

In a fourth step 306, the execution of the script 14, licence_form.cmd, with the argument type=full causes the writing of "Type: full" to a temporary text file 16 stored on the second server computer 12. This text file 16 will therefore now contain:

Type: full

Having regard to the above comment on holding state over several HTTP connections, it is this text file 16 that is used to hold the state of the form as it is being completed step by step through the maze 20, each step having a separate HTTP connection.

In a fifth step 308, under the control of the script 14, a new HTML document can be opened and this state read back thereinto. This new HTML document may, for example, take the form of the licence application as completed so far.

In a sixth step 310, this new HTML document can then be returned to the client computer 6 thereby closing the HTTP session. With the return of this HTML document to the client computer 6, the user will see, for example, a partially completed driving licence application form in the Web browser window:

LICENCE APPLICATION
TYPE: FULL

Alternatively, the returned HTML document might simply contain an acknowledgement ("You have chosen a full licence").

Subsequently, the user's avatar will be presented with another choice. For example, data entry will be required in the application form in respect of whether or not a motorcycle licence is also required.

Figure 4:
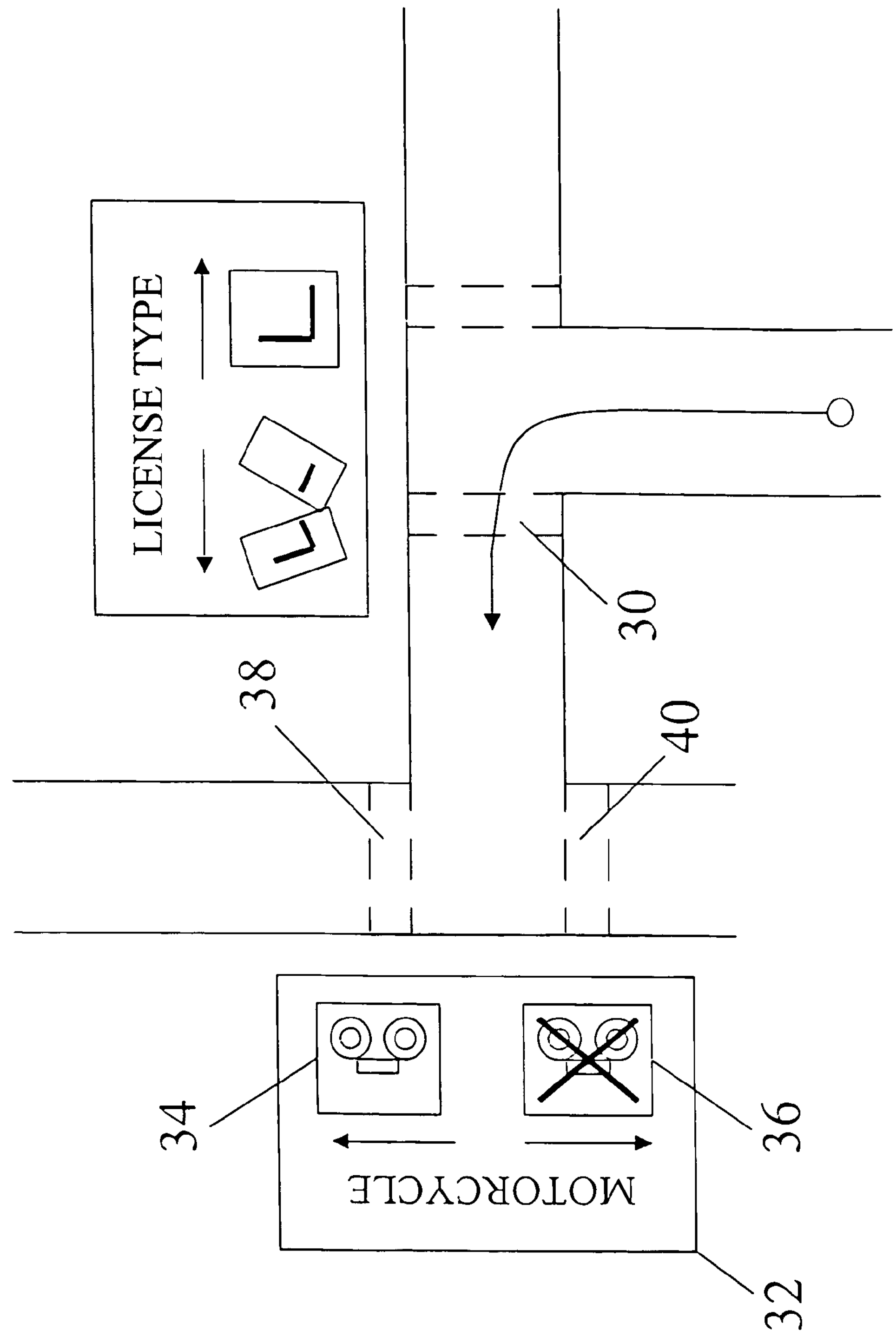
FIG. 4 is a second schematic representation of the virtual environment of FIG. 2.

As illustrated in FIG. 4, at a second branching of the maze, a choice relating to the inclusion or otherwise of a motorcycle licence is represented graphically at a second point on the maze wall 32. In like fashion to the above, a yes option 34 is indicated as leading off to the right and a no option 36 leading off to the left. Again, in like fashion to the above, a yes object wall 38 is placed across the right hand path and a no object wall 40 is placed across the left hand path.

Figure 5:
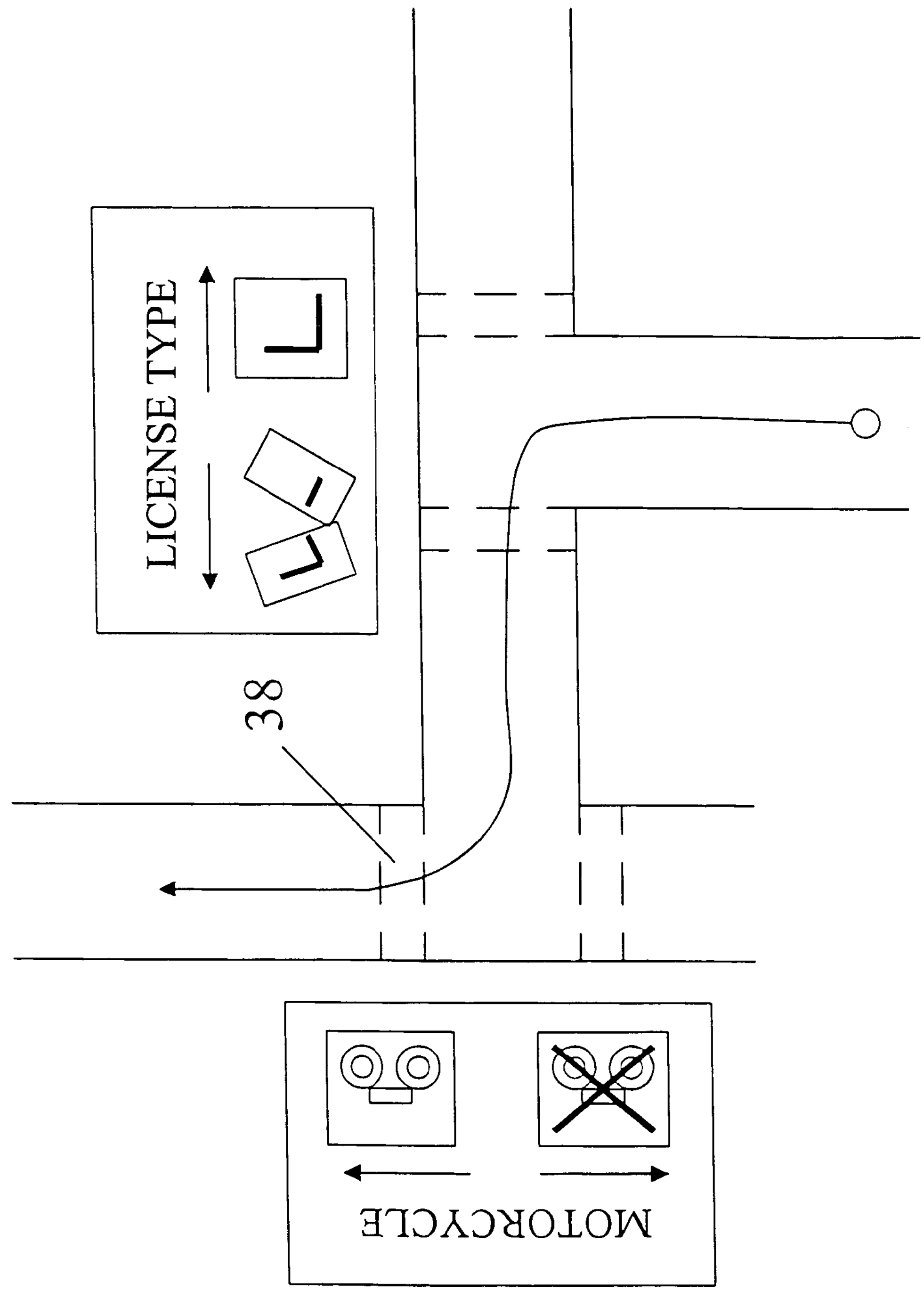
FIG. 5 is a third schematic representation of the virtual environment of FIG. 2.

The Bump command associated with the right hand wall object 38 may, for example, take the form:

create visible off, solid off; bump url http://server2.relevantauthority.gov/drive-cgi/licence_form.cmd?motorcycle=yes Having regard to FIGS. 3 and 5, the passage of the avatar through the yes wall 38 will cause a repeat of steps 300 to 310, but with the field motorcycle=yes being set instead of type=full.

In this way, "Motorcycle: yes" will be also written to the text file such that, in this example, the contents of the text file, representing the state of the further completed form, will be:

Type: full

Motorcycle: yes

Thus the HTML document representing the partially completed driving licence application form (with "Type: Full") displayed for the user in the Web browser window will now indicate:

LICENCE APPLICATION

TYPE: FULL

MOTORCYCLE: YES

As further progress is made through the maze, so the setting of more and more fields in the text file will be effected. In like manner, when the contents of the text file are read back into the HTML form and then presented to the user, more and more entries in the form will be filled in.

Furthermore, at the very beginning of a session, a user will log-in to the virtual environment, providing for user identification. This information may be utilised, along with a system timestamp, for the appropriate identification requirements when filling in the data record, in this case a driving licence application form. This information relating to the identity of the user and, for example, the timestamp, to indicate the date and time at which the form was filled in, may also be gathered and written to the form in like fashion with the above.

In this way, the final state of the completed application form might, for example, be represented by a text file containing:

Day Date

Name: applicant 1

Address: home 1

Email: applicant 1@isp.com

Type: full

Motorcycle: yes

Glasses to read number plate at 20.5 m: yes

Health problems affecting driving ability: no

In this way, a data record (the driving licence application form) is filled in, according to the invention, through mere control of the motion of an avatar through a maze whose branching structure implements the fields and options available therein.

Figure 6:
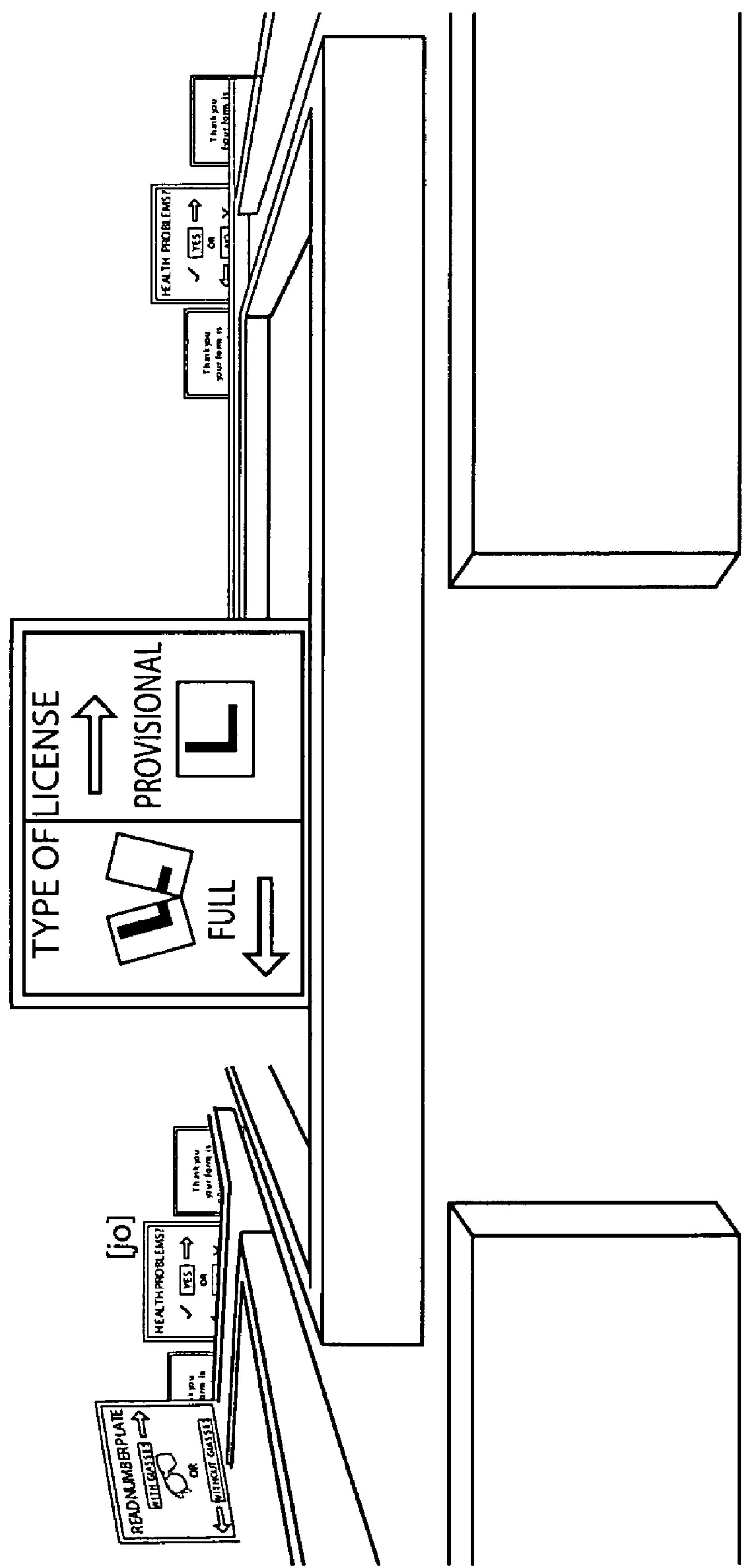
FIGS. 6 to 8 depict an implementation of the virtual environment of FIG. 2.
Figure 7:
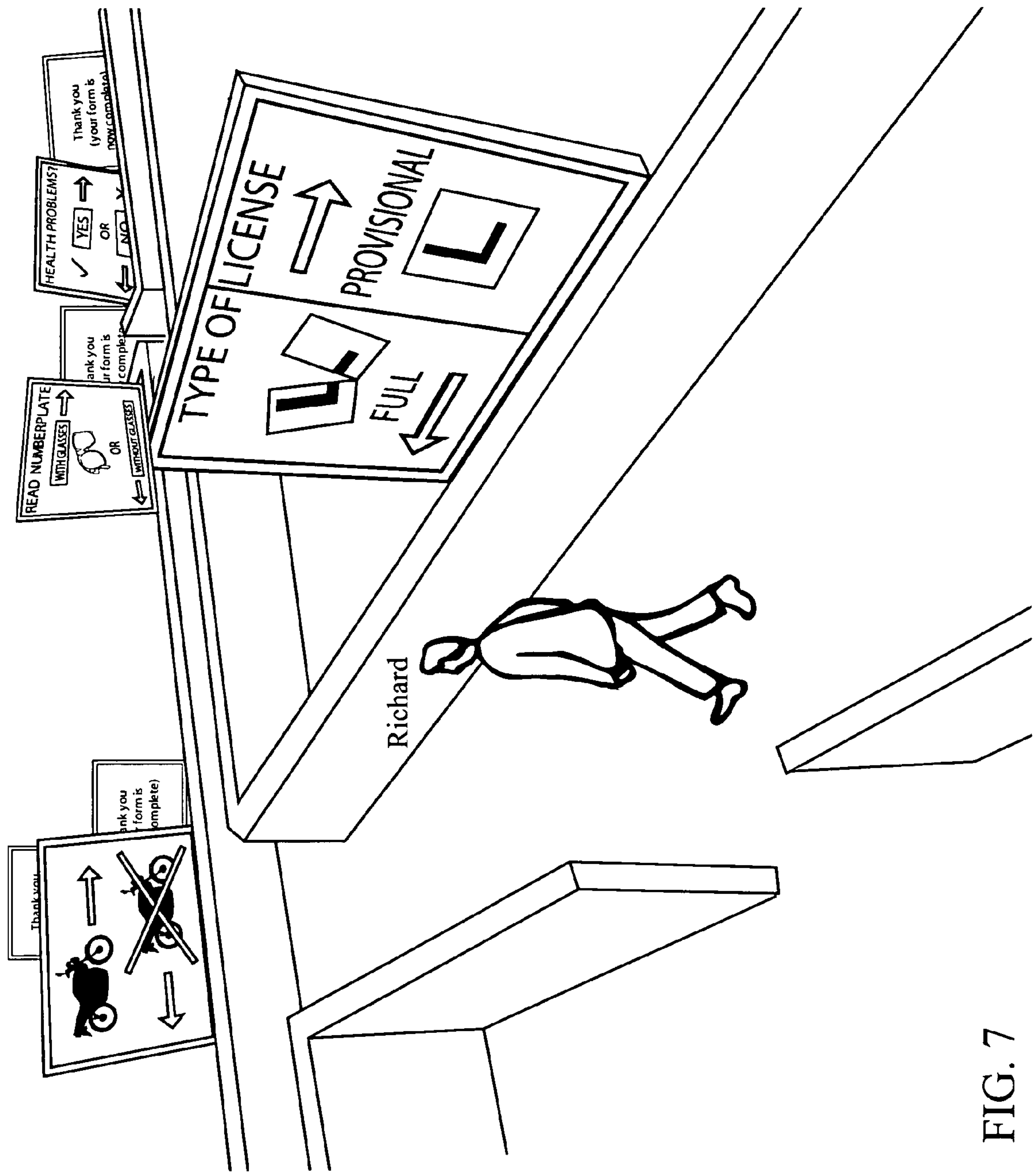
Figure 8:
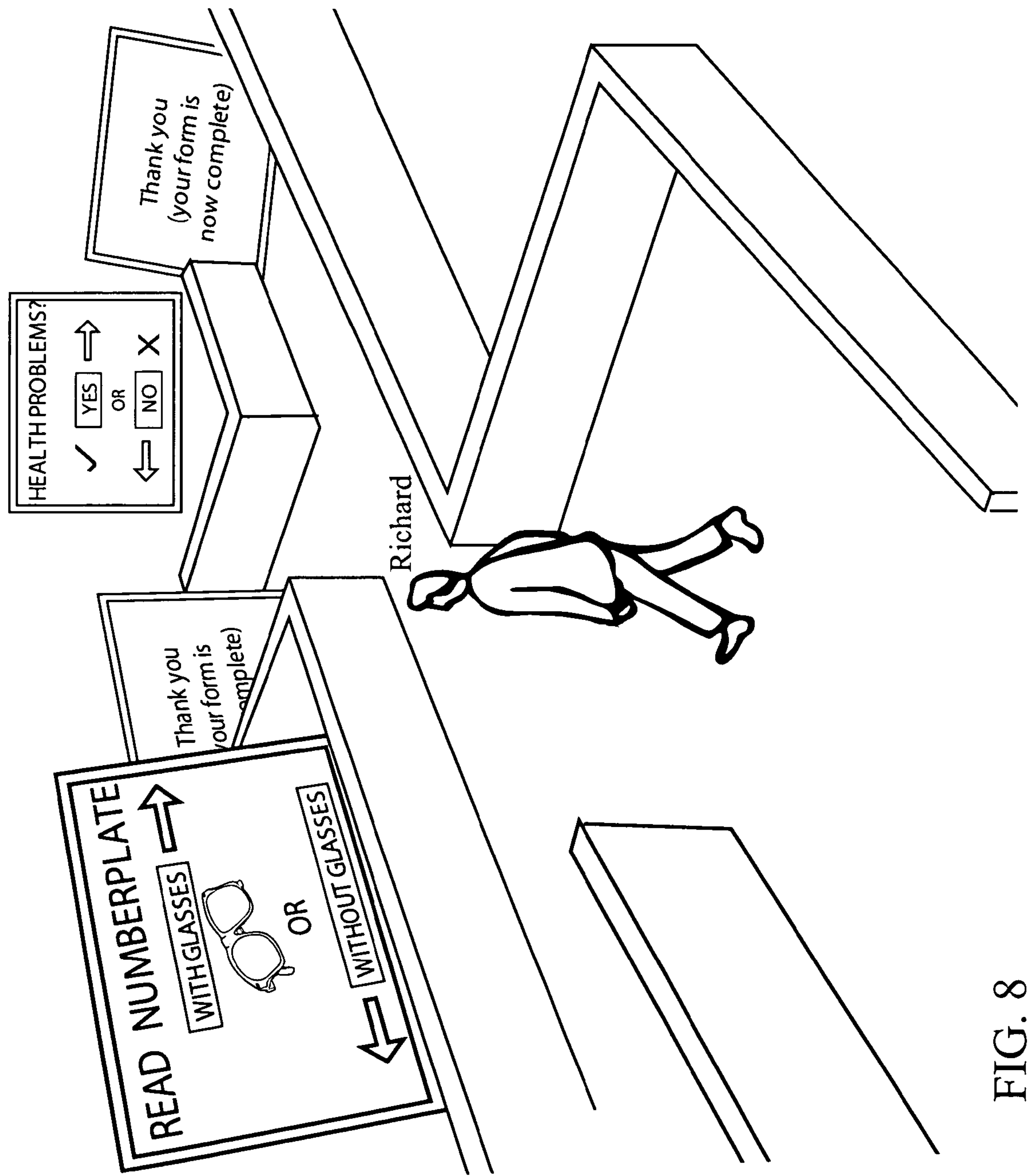

As indicated above, FIGS. 6 to 8 depict an implementation of the virtual environment of FIG. 2.

Once the form has been so completed, then it may be processed in whatever manner is desired.

In particular, the user might be presented with the completed form to check (via the HTML document presented in the Web browser window). In like fashion with the above, a further selectable option might be presented to submit the form (with, for example, submit=yes). Alternatively, the now completed HTML might be submitted in a more conventional fashion by clicking on a submit button on the form itself as presented in the Web browser window. If the form is submitted, then under the control of the script 14, the application form can be processed as desired.

A variety of applications would be well suited to use of a method according to the invention. Users might for example complete airline, train or other travel ticket forms, holiday or other travel forms, vehicle rental forms, bank account or credit card applications, item or service purchase or utility connection applications and such like. Following the completion of such application forms, a service could then be provided as a result of processing the forms, for example, making a ticket booking on the basis of a completed ticket application form or setting up a new bank account on the basis of a bank account application form. Further, operators might, for example, complete call centre records. Databases might be updated or faults might be logged and, following processing, diagnosis made and corrective action taken.

It is to be noted that, whilst completing a form, should the user want to change an option already selected, then the user may simply cause the avatar to move back to the relevant data entry choice and then cause the avatar to take the branch of the maze corresponding to the new choice. In this way, the field in the text file 16 corresponding to the original choice (for example, motorcycle=yes) would then be overwritten by an entry corresponding to the new choice (for example, motorcycle=no).

If metadata is gathered which is associated with the user in addition to the identification information gathered at the beginning of the session, this could be used as a further argument input to the script 14.

If, for example, a language tag were available, then the (partially) completed form returned to the user could be in the language specified by the metadata tag, where supported. Where possible, so long as the symbolic representations of the data fields and the options available in respect of those data fields were sufficiently pan-cultural, then the method could be used to allow a great variety of users to effect data input. Copies of the data records so created could then be expressed in whichever language is (or languages are) required.

Further, if, for example, a digital certificate were available, then an authentication check could be carried out before the process of filling in the data record is allowed, or perhaps before submission of a completed data record.

If a user were only part of the way through filling a data record but desired to suspend the process, one advantage of a three dimensional virtual environment (typically unlike the real world) is that the user may simply cause the avatar to leave the maze vertically and move off elsewhere in the virtual environment. The position reached in the maze could then be stored for subsequent resumption of the process.

As will be known from other virtual environment applications, system avatars can be created which can mingle with avatars controlled by human (or other) users. These system avatars can be located at appropriate points in the virtual environment to assist user controlled avatars where necessary. Such system avatars could be used in the context of the maze system 20, for example, to assist in the direction of user's avatars around the maze or could respond with more information in order to assist a user to make a decision at a branching point.

As indicated above, the invention can also be used in applications less sophisticated than those utilising a virtual environment. A two dimensional display could equally well be used to illustrate appropriate information option representations for fields in a data record and those options could be chosen by moving, for example, a mouse controlled pointer arrow as to touch the desired representation. In like fashion with the above, that associated option could then be stored in the appropriate field of the data record.

What is claimed is:

1. A method of entering information by a user into a data form utilizing a virtual environment in which a user can direct at least one indicator of position; at least one location in said virtual environment being associated with a field of said data form and with one or more selectable information options for inclusion in said field, the method comprising:

providing said user with representations of said selectable information options distributed around said at least one location;

monitoring the position of said indicator of position in said virtual environment;

in the event that said indicator of position moves into a predefined proximity with one of said representations of said selectable options, detecting the selection of said one of said selectable options;

and storing said selected one option in said field of said data form;

wherein said virtual environment contains a plurality of such locations, each such location being associated with a different field of said data form and with different selectable information options, further comprising constraining said indicator of position to move between said plurality of locations.

2. A method as in claim 1 further comprising providing said user with a representation of said field.

3. A method as in claim 1 in which said predefined proximity corresponds to zero distance between said indicator of position and said one of said representations.

4. A method of service provision; said service being provided in dependence upon a data form, information being entered by a user into said data form through utilization of a virtual environment in which a user can direct at least one indicator of position; said data form comprising a plurality of mandatory fields; each of a plurality of locations in said virtual environment being associated with respective mandatory fields and with at least one selectable information options for inclusion in each said associated mandatory field, the method comprising:

providing said user with representations of said selectable information options distributed around each said location;

monitoring the position of said indicator of position in said virtual environment;

in respect of each said location, in the event that said indicator of position moves into a predefined proximity with one of said representations of said selectable options, detecting the selection of said one of said selectable options;

storing each said selected option in said associated mandatory field of said data form; and in the event that said one or more mandatory fields are complete, providing said service in response to processing said completed data form.

5. A computer program storage medium, said medium embodying computer readable code for reading into a computer and executable by said computer to perform the method of claim 1.

6. An apparatus for entering information by a user into a data form, said apparatus hosting a virtual environment in which a user can direct at least one indicator of position; at least one location in said virtual environment being associated with a field of said data form and with at least one selectable information options for inclusion in said field, said apparatus comprising:

means arranged to provide said user with representations of said selectable information options distributed around said at least one location;

means arranged to monitor the position of said indicator of position in said virtual environment;

means arranged to detect the selection of said one of said selectable options in the event that said indicator of position moves into a predefined proximity with one of said representations of said selectable options; and means arranged to store said selected one option in said field of said data form;

wherein said virtual environment contains a plurality of such locations, each such location being associated with a different field of said data form and with different selectable information options, further comprising constraining said indicator of position to move between said plurality of locations.

* * * * *